US011333383B2

(12) United States Patent
Ozaki

(10) Patent No.: US 11,333,383 B2
(45) Date of Patent: May 17, 2022

(54) ENVIRONMENT ESTIMATION DEVICE AND ENVIRONMENT ESTIMATION METHOD

(71) Applicant: PANASONIC INTELLECTUAL PROPERTY MANAGEMENT CO., LTD., Osaka (JP)

(72) Inventor: Yuuji Ozaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 460 days.

(21) Appl. No.: 16/486,787

(22) PCT Filed: Jan. 23, 2018

(86) PCT No.: PCT/JP2018/001989
§ 371 (c)(1),
(2) Date: Aug. 16, 2019

(87) PCT Pub. No.: WO2018/179731
PCT Pub. Date: Oct. 4, 2018

(65) Prior Publication Data
US 2019/0360716 A1 Nov. 28, 2019

(30) Foreign Application Priority Data

Mar. 29, 2017 (JP) .............................. JP2017-065732

(51) Int. Cl.
*G06F 17/00* (2019.01)
*F24F 11/63* (2018.01)
(Continued)

(52) U.S. Cl.
CPC .............. *F24F 11/63* (2018.01); *G06N 20/00* (2019.01); *G06F 30/20* (2020.01); *G06F 2111/10* (2020.01)

(58) Field of Classification Search
CPC ............. G06F 17/5009; G06F 17/5018; G06F 17/5022; G06F 17/5036
(Continued)

(56) References Cited

U.S. PATENT DOCUMENTS

2012/0040601 A1 2/2012 Harayama
2012/0078417 A1* 3/2012 Connell, II ............ B25J 13/087
700/248
(Continued)

FOREIGN PATENT DOCUMENTS

JP   2010-112605 A   5/2010
JP   2011-089677 A   5/2011
(Continued)

OTHER PUBLICATIONS

Japanese Decision of Refusal issued in Japanese Patent Application No. 2019-508614, dated Dec. 22, 2020; with English translation.
(Continued)

*Primary Examiner* — Andy Ho
(74) *Attorney, Agent, or Firm* — McDermott Will & Emery LLP

(57) ABSTRACT

An environment estimation device includes a determination unit and a correction unit. The determination unit changes, by varying a boundary variable from an initial value, first environmental information in a specific region of an estimated three-dimensional environmental distribution, and determines, as an object boundary variable, the boundary variable at a time when a difference between the first environmental information and second environmental information in the specific region included in obtained environmental information inside a space is within a predetermined range. The correction unit corrects a numerical fluid dynamic model, by fixing a variation parameter of the numerical fluid dynamic model at the determined object boundary variable.

8 Claims, 6 Drawing Sheets

(51) Int. Cl.
*G06N 20/00* (2019.01)
*G06F 30/20* (2020.01)
*G06F 111/10* (2020.01)

(58) Field of Classification Search
USPC ...................................................... 703/2, 13
See application file for complete search history.

(56) References Cited

U.S. PATENT DOCUMENTS

| | | |
|---|---|---|
| 2012/0209435 A1 | 8/2012 | Harayama |
| 2015/0041550 A1 | 2/2015 | Honda |
| 2018/0195755 A1 | 7/2018 | Nishida et al. |

FOREIGN PATENT DOCUMENTS

| | | |
|---|---|---|
| JP | 2012-037177 A | 2/2012 |
| JP | 2013-002672 A | 1/2013 |
| JP | 2015-036589 A | 2/2015 |
| JP | 2015-148410 A | 8/2015 |
| JP | 2015-190625 A | 11/2015 |
| WO | 2016/129085 A1 | 8/2016 |
| WO | 2017/029755 A1 | 2/2017 |

OTHER PUBLICATIONS

International Search Report and Written Opinion dated Apr. 24, 2018 in International Application No. PCT/JP2018/001989; with partial English translation.

* cited by examiner

ENVIRONMENT ESTIMATION DEVICE AND ENVIRONMENT ESTIMATION METHOD

CROSS-REFERENCE OF RELATED APPLICATIONS

This application is the U.S. National Phase under 35 U.S.C. § 371 of International Patent Application No. PCT/JP2018/001989, filed on Jan. 23, 2018, which in turn claims the benefit of Japanese Application No. 2017-065732, filed on Mar. 29, 2017, the entire disclosures of which Applications are incorporated by reference herein.

TECHNICAL FIELD

The present invention relates to an environment estimation device and an environment estimation method.

BACKGROUND ART

PTL 1 discloses a technique of recognizing a vertical temperature distribution in a building such as a warehouse to allow products, for which appropriate storage temperature has been set, to be managed at ordinary temperature as much as possible.

CITATION LIST

Patent Literature

PTL 1: Japanese Unexamined Patent Application Publication No. 2010-112605

SUMMARY OF THE INVENTION

Technical Problem

It is difficult to have a target environmental state at a given position in a space. For example, in the case of air-conditioning a space by an air conditioner, the air-conditioning is performed based on the temperature or humidity detected by a sensor included in the air conditioner. To set a target temperature or a target humidity at a position where no sensor is located in the space, the temperature at the position where no sensor is located needs to be estimated.

The present invention provides an environment estimation device and an environment estimation method that can estimate an environmental state at a given position in a space.

Solution to Problem

An environment estimation device according to an aspect of the present invention includes: an obtainment unit configured to obtain an operation state of at least one appliance provided in a space and environmental information inside the space; a generation unit configured to generate, based on the operation state obtained and the environmental information inside the space obtained, a numerical fluid dynamic model including, as a variation parameter, a boundary variable corresponding to the environmental information inside the space at a boundary between inside the space and outside the space; an estimation unit configured to estimate a three-dimensional environmental distribution inside the space, based on the numerical fluid dynamic model generated; a determination unit configured to change, by varying the boundary variable from an initial value, first environmental information in a specific region of the three-dimensional environmental distribution estimated, and determine, as an object boundary variable, the boundary variable at a time when a difference between the first environmental information and second environmental information in the specific region included in the environmental information inside the space obtained is within a predetermined range; and a correction unit configured to correct the numerical fluid dynamic model, by fixing the variation parameter of the numerical fluid dynamic model at the object boundary variable determined.

An environment estimation method according to an aspect of the present invention includes: obtaining an operation state of at least one appliance provided in a space and environmental information inside the space; generating, based on the operation state obtained and the environmental information inside the space obtained, a numerical fluid dynamic model including, as a variation parameter, a boundary variable corresponding to the environmental information inside the space at a boundary between inside the space and outside the space; estimating a three-dimensional environmental distribution inside the space, based on the numerical fluid dynamic model generated; changing, by varying the boundary variable from an initial value, first environmental information in a specific region of the three-dimensional environmental distribution estimated, and determining, as an object boundary variable, the boundary variable at a time when a difference between the first environmental information and second environmental information in the specific region included in the environmental information inside the space obtained is within a predetermined range; and correcting the numerical fluid dynamic model, by fixing the variation parameter of the numerical fluid dynamic model at the object boundary variable.

Advantageous Effect of Invention

The environment estimation device and environment estimation method according to an aspect of the present invention can estimate an environmental state at a given position in a space.

DESCRIPTION OF EXEMPLARY EMBODIMENT

An embodiment will be described below, with reference to drawings. The embodiment described below shows a general or specific example. The numerical values, shapes, materials, structural elements, the arrangement and connection of the structural elements, steps, the processing order of the steps etc. shown in the following embodiment are mere examples, and do not limit the scope of the present invention. Of the structural elements in the embodiment described below, the structural elements not recited in any one of the independent claims representing the broadest concepts are described as optional structural elements.

Each drawing is a schematic and does not necessarily provide precise depiction. The substantially same structural elements are given the same reference marks throughout the drawings, and repeated description may be omitted or simplified.

Embodiment

[Overview of Environment Control System]

Figure 1:
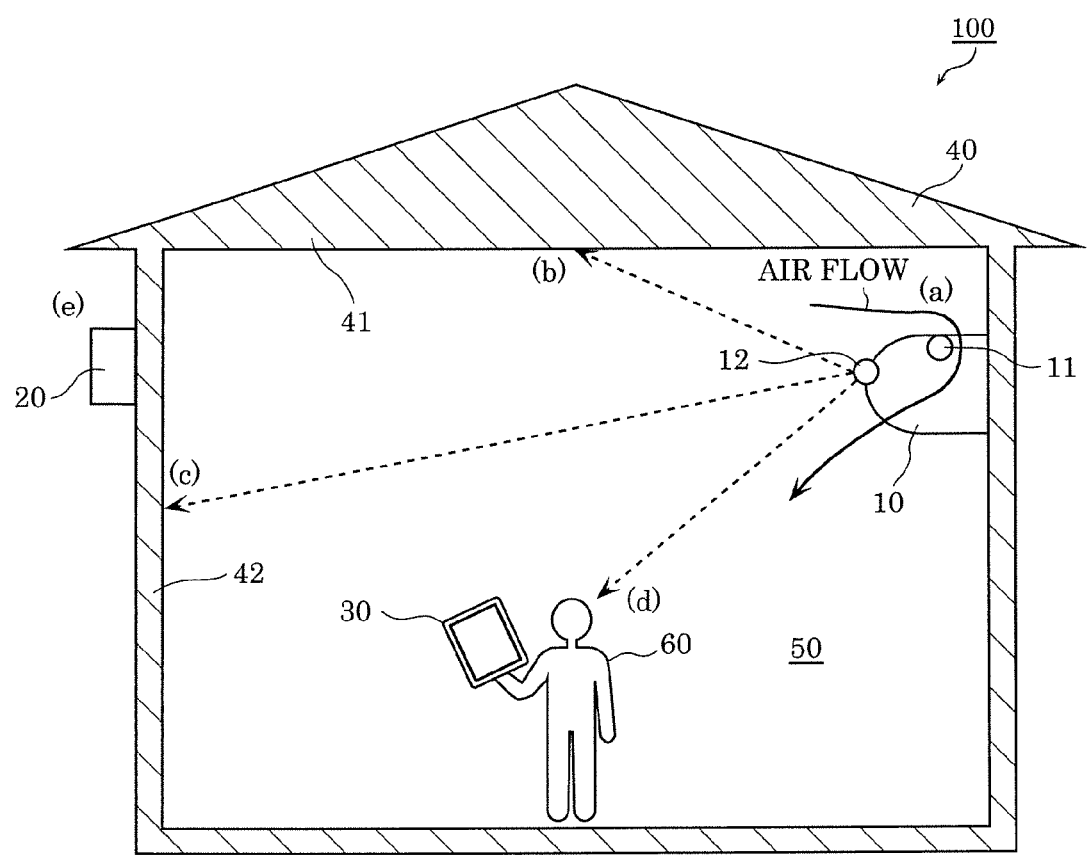
FIG. 1 is a diagram schematically illustrating an environment control system according to an embodiment.
Figure 2:
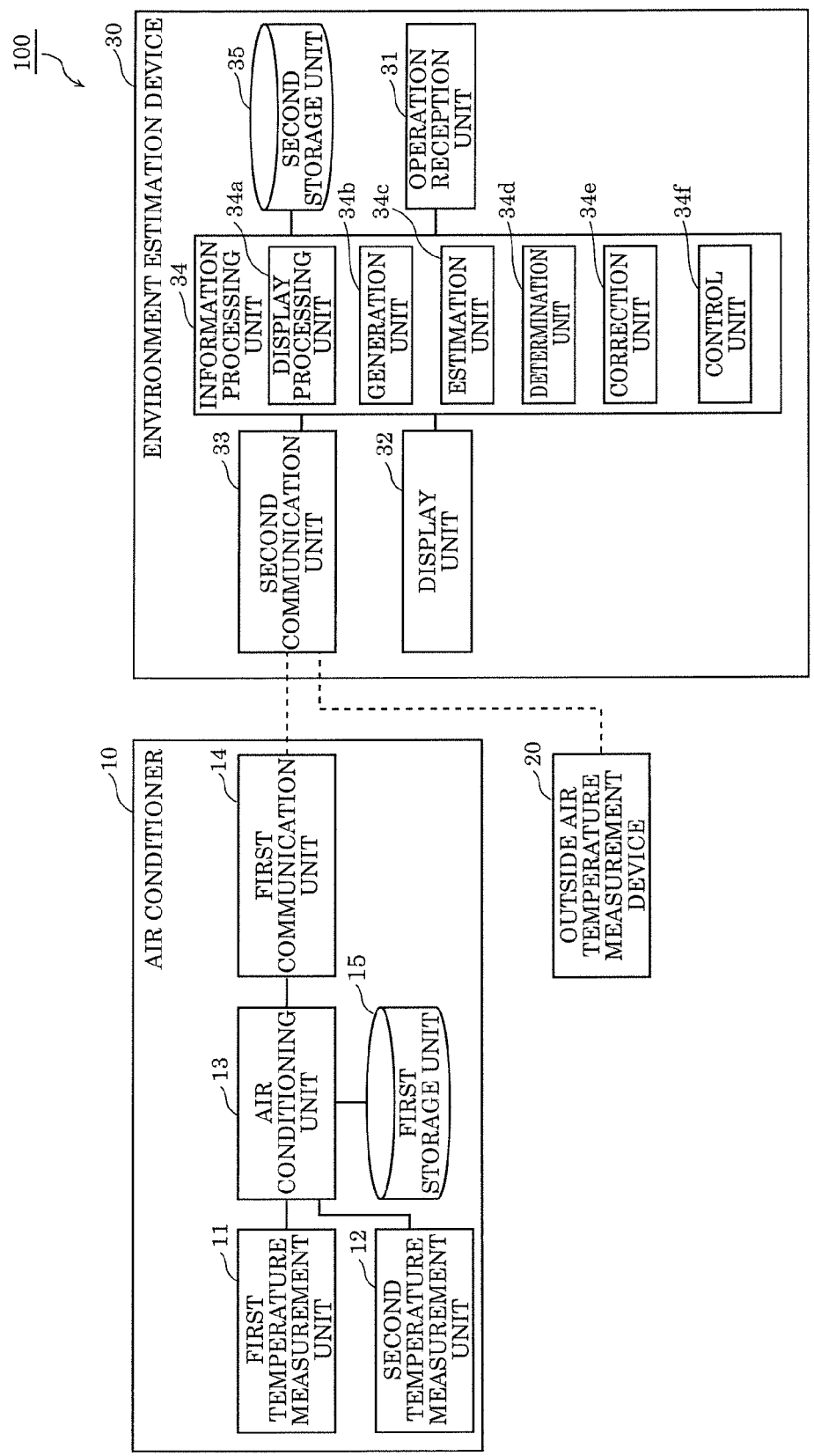
FIG. 2 is a block diagram illustrating the functional structure of the environment control system according to the embodiment.

The overall structure of an environment control system according to an embodiment will be described below. FIG. 1 is a diagram schematically illustrating the environment control system according to the embodiment. FIG. 2 is a block diagram illustrating the functional structure of the environment control system according to the embodiment.

As illustrated in FIGS. 1 and 2, environment control system 100 is a system in which, by user 60 operating environment estimation device 30, air conditioner 10 can be controlled to set a target temperature at a given position in space 50. Environment control system 100 includes air conditioner 10, outside air temperature measurement device 20, and environment estimation device 30. Each of the devices will be described below.

[Air Conditioner]

Air conditioner 10 is a device that adjusts the temperature in space 50 surrounded by building 40 by performing at least one of cooling and heating. Air conditioner 10 is located in space 50. Specifically, air conditioner 10 includes first temperature measurement unit 11, second temperature measurement unit 12, air conditioning unit 13, first communication unit 14, and first storage unit 15.

First temperature measurement unit 11 is attached to, for example, a suction port for sucking in air in space 50, and measures the temperature in space 50. In other words, first temperature measurement unit 11 measures the temperature at point (a) in FIG. 1. Specifically, first temperature measurement unit 11 is a device including an element for temperature measurement such as a thermistor or a thermocouple.

Second temperature measurement unit 12 measures the temperature of ceiling 41, wall 42, and the like of building 40. In other words, second temperature measurement unit 12 measures the temperature at point (b) and the temperature at point (c) in FIG. 1. Second temperature measurement unit 12 also measures the temperature in the vicinity of user 60. In other words, second temperature measurement unit 12 measures the temperature at point (d) in FIG. 1. Specifically, second temperature measurement unit 12 is a thermal image sensor including a plurality of infrared detectors.

Air conditioning unit 13 performs air-conditioning (cooling and heating) indoors, based on a control signal received by first communication unit 14. Air conditioning unit 13 also causes first communication unit 14 to transmit temperature information indicating the temperature measured by first temperature measurement unit 11 and temperature information indicating the temperature measured by second temperature measurement unit 12. Air conditioning unit 13 further causes first communication unit 14 to transmit operation state information (hereafter also simply referred to as "operation state") indicating the current operation state. Specifically, the operation state includes operation mode, set temperature, wind direction, air volume, etc.

Air conditioning unit 13 is specifically implemented by a processor, a microcomputer, or a dedicated circuit. Air conditioning unit 13 may be implemented by a combination of two or more of a processor, a microcomputer, and a dedicated circuit.

First communication unit 14 is a communication module (communication circuit) for air conditioner 10 to communicate with environment estimation device 30. For example, first communication unit 14 receives a control signal from environment estimation device 30. First communication unit 14 also transmits temperature information or operation state information to environment estimation device 30. Communication between air conditioner 10 and environment estimation device 30 may be wired communication or wireless communication. Communication may be performed by any communication standard.

First storage unit 15 is a storage device storing a control program executed by air conditioning unit 13 and the like. Specifically, first storage unit 15 is implemented by semiconductor memory or the like.

[Outside Air Temperature Measurement Device]

Outside air temperature measurement device 20 is a device that is attached to an outer wall of building 40 or the like and measures outside air temperature around building 40. In other words, outside air temperature measurement device 20 measures the temperature at point (e) in FIG. 1. Specifically, outside air temperature measurement device 20 is a device including a temperature measurement element such as a thermistor or a thermocouple.

Outside air temperature measurement device 20 includes a communication module (communication circuit) for communicating with environment estimation device 30, and transmits temperature information indicating the outside air temperature to environment estimation device 30.

[Environment Estimation Device]

Environment estimation device 30 is a device that generates a numerical fluid dynamic model customized in association with space 50. For example, environment estimation device 30 is a tablet terminal. Environment estimation device 30 may be any other portable information terminal such as a smartphone. Environment estimation device 30 may be a stationary information terminal such as a personal computer. Environment estimation device 30 may be a dedicated device corresponding to air conditioner 10. In the embodiment, environment estimation device 30 also functions as a control device operated by user 60 to control air conditioner 10.

Specifically, environment estimation device 30 includes operation reception unit 31, display unit 32, second communication unit 33, information processing unit 34, and second storage unit 35.

Operation reception unit 31 is a user interface that receives operation of user 60. In the case where environment estimation device 30 is a tablet terminal, operation reception unit 31 is a graphical user interface (GUI) including a touch panel. The specific form of operation reception unit 31 is not limited. In the case where environment estimation device 30 is a personal computer, operation reception unit 31 is a keyboard, a mouse, and the like.

Display unit 32 displays an image or the like subjected to user operation, based on control of display processing unit 34a. Specifically, display unit 32 is implemented by a liquid crystal panel, an organic EL panel, or the like.

Second communication unit 33 is a communication module (communication circuit) for environment estimation device 30 to communicate with air conditioner 10 and outside air temperature measurement device 20. Second communication unit 33 is an example of an obtainment unit. For example, second communication unit 33 obtains the temperature information inside space 50 indicating the temperature measured by each of first temperature measurement unit 11 and second temperature measurement unit 12 in air conditioner 10. Second communication unit 33 also obtains the operation state of air conditioner 10 located in space 50. Second communication unit 33 obtains the temperature information outside space 50 (outside air temperature information) indicating the temperature measured by outside air temperature measurement device 20.

Second communication unit 33 transmits a control signal to air conditioner 10 based on control of control unit 34f, when operation reception unit 31 receives operation of user 60. Communication between environment estimation device 30 and air conditioner 10 and communication between environment estimation device 30 and outside air temperature measurement device 20 may each be wired communication or wireless communication. Communication may be performed by any communication standard.

Information processing unit 34 performs various information processing relating to the operation of environment estimation device 30. Specifically, information processing unit 34 is implemented by a processor, a microcomputer, or a dedicated circuit. Information processing unit 34 may be implemented by a combination of two or more of a processor, a microcomputer, and a dedicated circuit. Specifically, information processing unit 34 includes display processing unit 34a, generation unit 34b, estimation unit 34c, determination unit 34d, correction unit 34e, and control unit 34f.

Display processing unit 34a generates a video signal for displaying an image subjected to operation of user 60, and outputs the generated video signal to display unit 32. Consequently, display unit 32 displays the image.

Generation unit 34b generates a first numerical fluid dynamic model customized for space 50, based on a numerical fluid dynamic model stored in second storage unit 35 beforehand (hereafter also referred to as "base model"), the temperature information obtained by second communication unit 33, and the operation state of air conditioner 10 obtained by second communication unit 33. The base model is a numerical fluid dynamic model as a basis for generating the first numerical fluid dynamic model customized for space 50. The first numerical fluid dynamic model includes the heat transfer rate at the boundary between inside space 50 and outside space 50, as a variation parameter (unknown). The heat transfer rate is an example of a boundary variable.

Estimation unit 34c estimates the three-dimensional temperature distribution inside space 50, based on the first numerical fluid dynamic model. Estimation unit 34c also estimates the three-dimensional temperature distribution inside space 50, based on a second numerical fluid dynamic model which is the corrected first numerical fluid dynamic model.

Determination unit 34d determines an object heat transfer rate which is an estimation optimum value of the heat transfer rate at the boundary, based on the result of estimating the three-dimensional temperature distribution by estimation unit 34c.

Correction unit 34e corrects the first numerical fluid dynamic model by applying the determined object heat transfer rate to the numerical fluid dynamic model. The second numerical fluid dynamic model which is the corrected first numerical fluid dynamic model is a numerical fluid dynamic model obtained by fixing the heat transfer rate as a variation parameter at the object heat transfer rate in the first numerical fluid dynamic model.

Control unit 34f controls air conditioner 10, based on the three-dimensional temperature distribution estimated using the second numerical fluid dynamic model. Specifically, control unit 34f causes second communication unit 33 to transmit a control signal, to control air conditioner 10.

Second storage unit 35 is a storage device storing the base model as a basis for generating the first numerical fluid dynamic model customized for space 50. After the first numerical fluid dynamic model and the second numerical fluid dynamic model are generated, second storage unit 35 also stores the first numerical fluid dynamic model and the second numerical fluid dynamic model. Second storage unit 35 also stores information such as the shape of space 50 (room shape) and the temperature measurement positions (the positions of points (a) to (e) in FIG. 1). Specifically, second storage unit 35 is implemented by semiconductor memory or the like.

[Second Numerical Fluid Dynamic Model Generation Operation]

Figure 3:
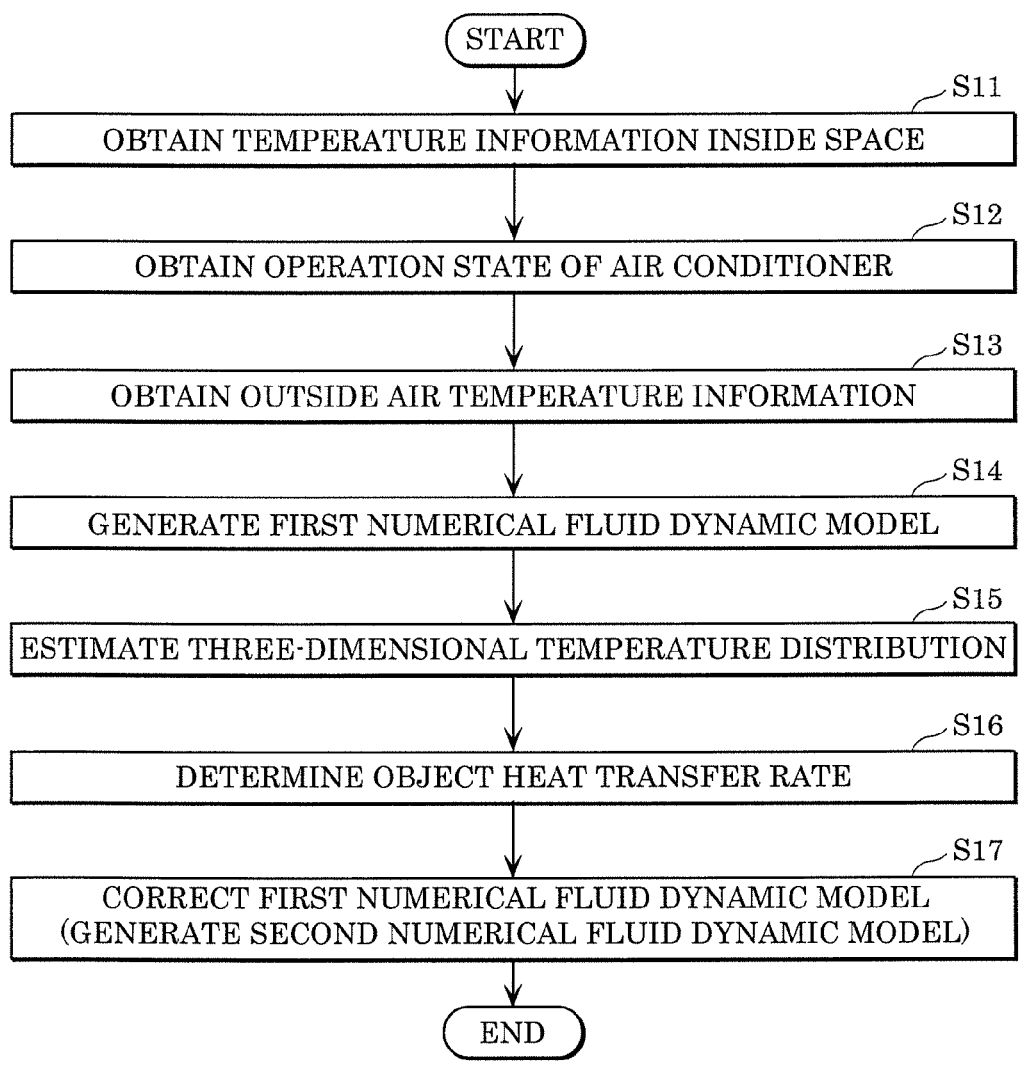
FIG. 3 is a flowchart of second numerical fluid dynamic model generation operation of an environment estimation device according to the embodiment.

Operations of environment estimation device 30 will be described below. Second numerical fluid dynamic model generation operation will be described first. FIG. 3 is a flowchart of the second numerical fluid dynamic model generation operation of environment estimation device 30. The temperature measurement positions, specific temperature values, etc. used in the following description are examples.

First, second communication unit 33 obtains the temperature information inside space 50 (S11). For example, information processing unit 34 causes second communication unit 33 to transmit a request for the temperature information to air conditioner 10. When such a request is received by first communication unit 14 in air conditioner 10, air conditioning unit 13 causes first communication unit 14 to transmit the temperature information indicating the current temperatures measured by first temperature measurement unit 11 and second temperature measurement unit 12 (the temperature information inside space 50 indicating the temperatures at points (a) to d) in FIG. 1). Second communication unit 33 thus obtains the temperature information inside space 50 transmitted from first communication unit 14.

Second communication unit 33 also obtains the operation state of air conditioner 10 (S12). For example, information processing unit 34 causes second communication unit 33 to transmit a request for the operation state to air conditioner 10. When such a request is received by first communication unit 14 in air conditioner 10, air conditioning unit 13 causes first communication unit 14 to transmit the current operation state. Second communication unit 33 thus obtains the operation state of air conditioner 10 transmitted from first communication unit 14.

Second communication unit 33 also obtains the temperature information outside space 50 (S13). For example, information processing unit 34 causes second communication unit 33 to transmit a request for the temperature information to outside air temperature measurement device 20. When such a request is received by outside air temperature measurement device 20, outside air temperature measurement device 20 transmits the temperature information indicating the current outside air temperature (the temperature information outside space 50 indicating the temperature at point (e) in FIG. 1). Second communication unit 33 thus receives the temperature information outside space 50 transmitted from outside air temperature measurement device 20. Second communication unit 33 may not necessarily obtain the temperature information outside space 50, that is, Step S13 may be omitted.

Generation unit 34b then generates the first numerical fluid dynamic model (S14). In other words, generation unit 34b models the temperature distribution inside space 50.

Specifically, generation unit 34b reads the base model and the information such as the shape of space 50 stored in second storage unit 35. Generation unit 34b customizes the read base model, based on the read information such as the shape of space 50, the temperature information inside space 50 obtained in Step S11, the operation state of air conditioner 10 obtained in Step S12, and the temperature information outside space 50 obtained in Step S13. Consequently, the first numerical fluid dynamic model suitable for space 50 is obtained.

The first numerical fluid dynamic model includes the heat transfer rate at the boundary between inside space 50 and outside space 50, as a variation parameter. Since it is difficult to obtain the heat transfer rate at every boundary defining space 50 beforehand, the heat transfer rate is taken to be a variation parameter, and a heat transfer rate (object heat transfer rate) considered as optimum is determined by calculation as described later.

The heat transfer rate is specifically a parameter indicating heat insulation performance such as a heat transmission coefficient (U value) or a heat loss coefficient (Q value). At the time of Step S14, the heat transfer rate takes an initial value. For example, the initial value may be an average heat transmission coefficient determined beforehand, or estimated by any of various methods as described later. For example, one initial value of the heat transfer rate is determined for space 50, and the heat transfer rate at every boundary defining space 50 is the same at the time of Step S14.

Any existing technique may be used to generate the first numerical fluid dynamic model. The first numerical fluid dynamic model is a model enabling estimation of the three-dimensional temperature distribution inside space 50 and including the heat transfer rate as a variation parameter, and may be stored in second storage unit 35 beforehand.

Next, estimation unit 34c estimates the three-dimensional temperature distribution inside space 50, based on the generated first numerical fluid dynamic model (S15). In other words, estimation unit 34c performs direct analysis.

Figure 4A:
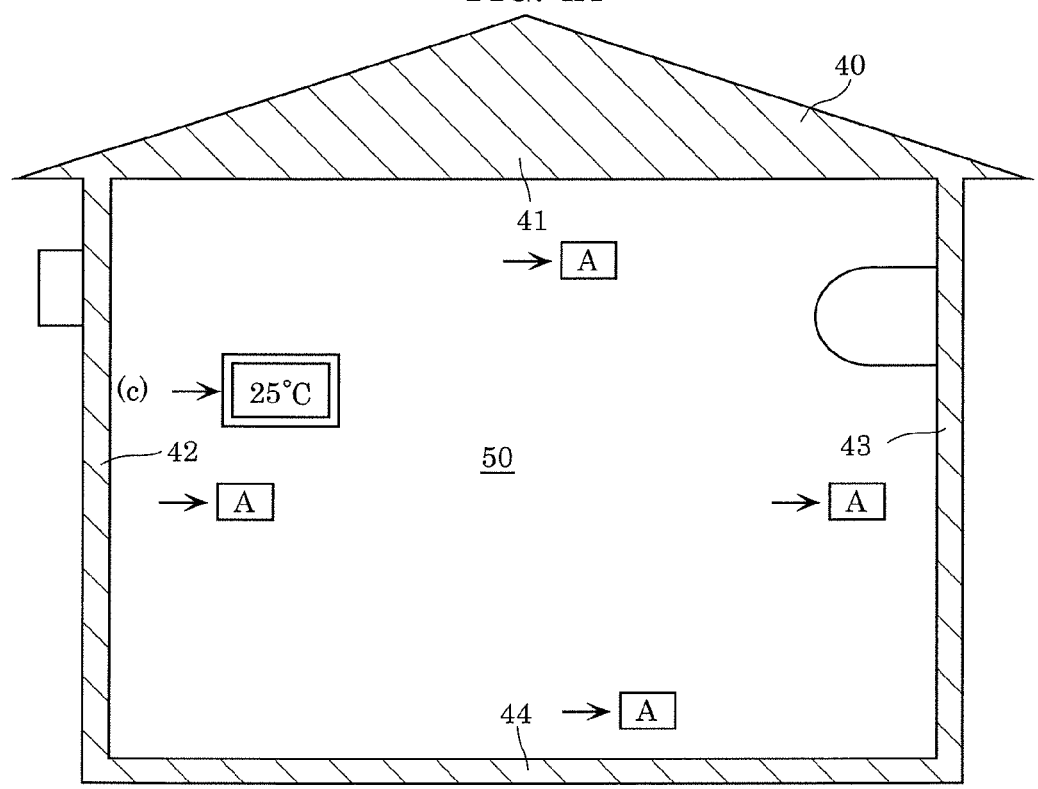
FIG. 4A is a first diagram illustrating an object heat transfer rate determination method.
Figure 4B:
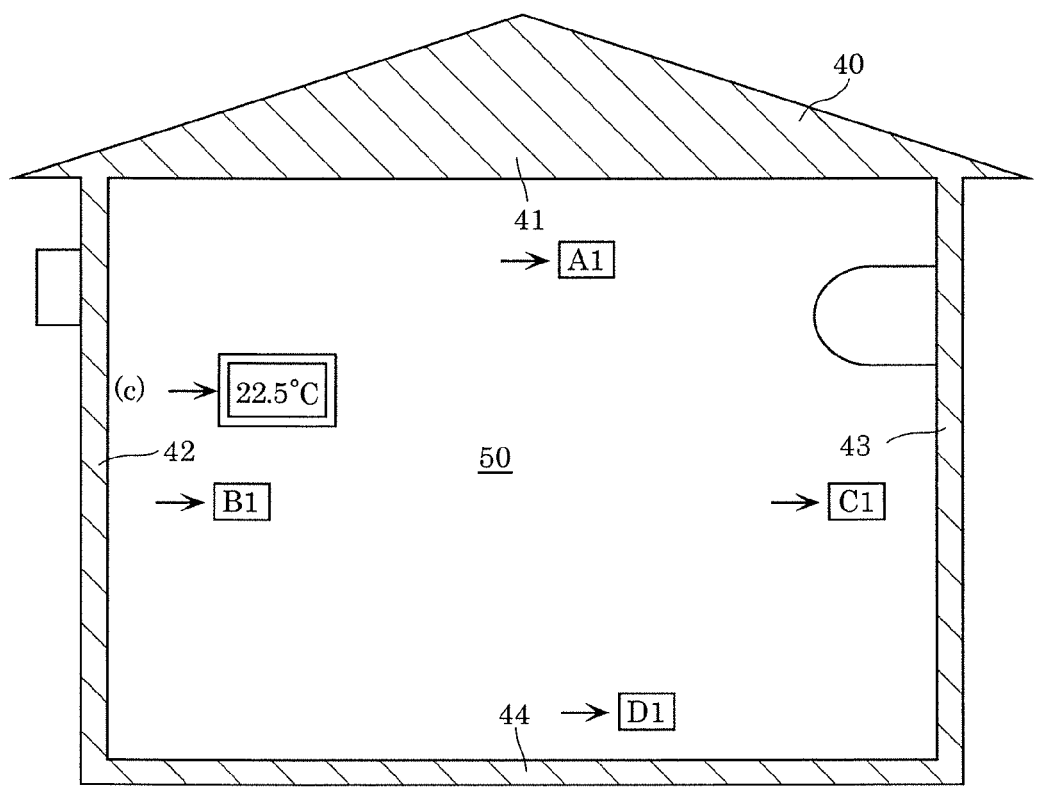
FIG. 4B is a second diagram illustrating the object heat transfer rate determination method.
Figure 4C:
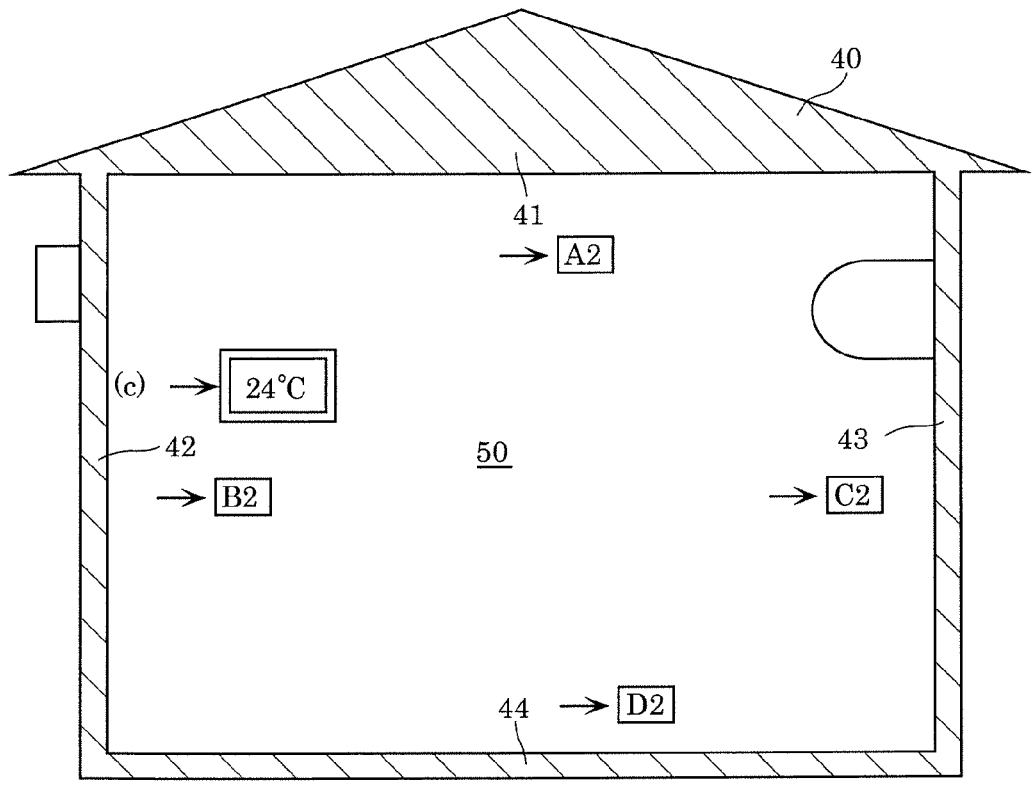
FIG. 4C is a third diagram illustrating the object heat transfer rate determination method.

Next, determination unit 34d performs sensitivity analysis by varying the heat transfer rate from the initial value, and determines the object heat transfer rate (S16). FIGS. 4A to 4C are diagrams illustrating an object heat transfer rate determination method by determination unit 34d.

FIG. 4A is a diagram illustrating the three-dimensional temperature distribution of space 50 in the case where the heat transfer rate is the initial value. One initial value is set for space 50, as mentioned above. Accordingly, when the initial value is denoted by A [W/(m²·K)], the three-dimensional temperature distribution is estimated on the assumption that the heat transfer rate at every boundary in space 50 is initial value A. Four boundaries, i.e. ceiling 41, wall 42, wall 43, and floor 44, are used in the following description for simplicity's sake. In FIG. 4A, the heat transfer rates at the boundaries (heat transfer rate at ceiling 41, heat transfer rate at wall 42, heat transfer rate at wall 43, heat transfer rate at floor 44) are (A, A, A, A).

Here, the analytical value of the temperature at point (c) is 25° C. This analytical value of the temperature is an example of first environmental information in a specific region in the estimated three-dimensional temperature distribution. The actual measurement value (actual measurement value measured by second temperature measurement unit 12) of the temperature at point (c) is, for example, 22° C. This temperature is second environmental information in the specific region obtained by second communication unit 33.

Determination unit 34d obtains the analytical value of the temperature at point (c), by varying the heat transfer rate from the initial value in the three-dimensional temperature distribution. For example, as illustrated in FIG. 4B, when the heat transfer rates at the boundaries are (A1, B1, C1, D1), the obtained analytical value of the temperature at point (c) is 22.5° C. As illustrated in FIG. 4C, when the heat transfer rates at the boundaries are (A2, B2, C2, D2), the obtained analytical value of the temperature at point (c) is 24.0° C.

Determination unit 34d repeatedly performs this process of varying the heat transfer rate from the initial value and obtaining the analytical value of the temperature at point (c). Determination unit 34d determines the heat transfer rate at the boundary at the time when the analytical value of the temperature at point (c) is closest to the measurement value of the temperature at point (c) (for example, when the difference between the analytical value and the measurement value is within a predetermined range), as the object heat transfer rate. Determination unit 34d may determine the object transfer rate using an existing optimization method or a method similar to it. Determination unit 34d may determine the object transfer rate using an existing sensitivity analysis method or a method similar to it.

A heat transfer rate is set for each boundary individually. In the case where a wall has a window, separate heat transfer rates may be assigned to the wall and the window.

After the object heat transfer rate is determined in Step S16, correction unit 34e corrects the first numerical fluid dynamic model, by applying the determined object heat transfer rate to the first numerical fluid dynamic model (S17). In other words, correction unit 34e generates the second numerical fluid dynamic model obtained by fixing the heat transfer rate as a variation parameter at the object heat transfer rate in the first numerical fluid dynamic model. The generated second numerical fluid dynamic model is stored in second storage unit 35.

As described above, environment estimation device 30 can estimate the temperature at a position where no temperature sensor is located, by the second numerical fluid dynamic model.

In Step S14, a C value indicating the airtightness of space 50 may be used to generate the first numerical fluid dynamic model. In this case, before Step S14, the C value may be obtained by second communication unit 33 from an external device such as a management device (server device) for managing the C value, or input by means of operation received by operation reception unit 31. In the case where the C value is input, operation reception unit 31 functions as an obtainment unit.

[Air Conditioner Control Operation]

Figure 5:
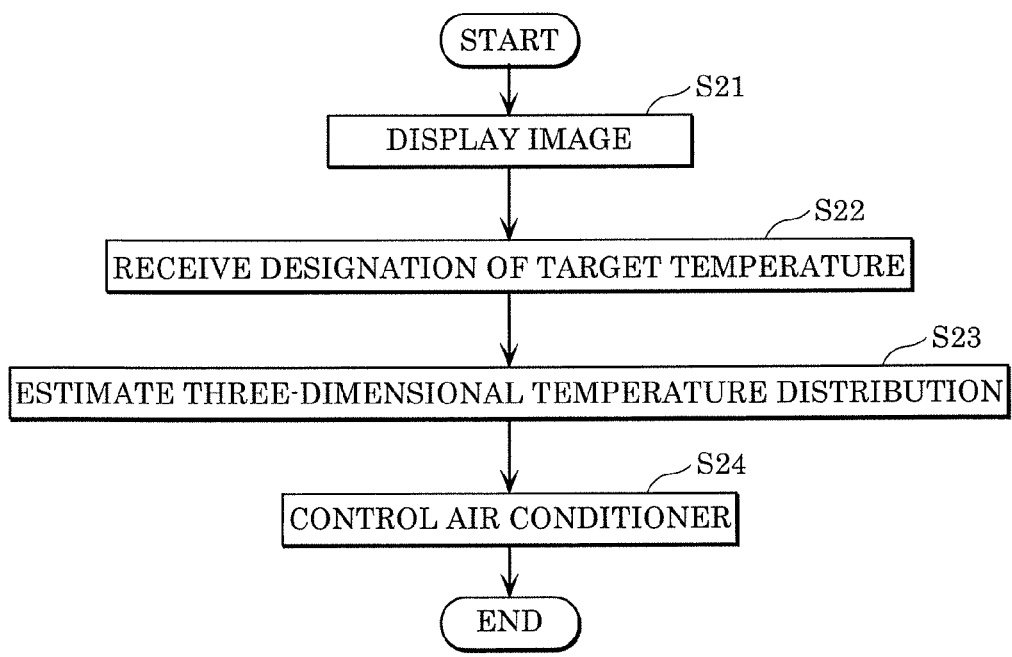
FIG. 5 is a flowchart of air conditioner control operation of the environment estimation device according to the embodiment.

In the embodiment, environment estimation device 30 also functions as a control device for controlling air conditioner 10, as mentioned above. With the second numerical fluid dynamic model generated in the above-described manner, user 60 can, by operating environment estimation device 30, operate air conditioner 10 for the temperature at a position where no temperature sensor is located. FIG. 5 is a flowchart of operation of controlling air conditioner 10 by environment estimation device 30.

Figure 6:
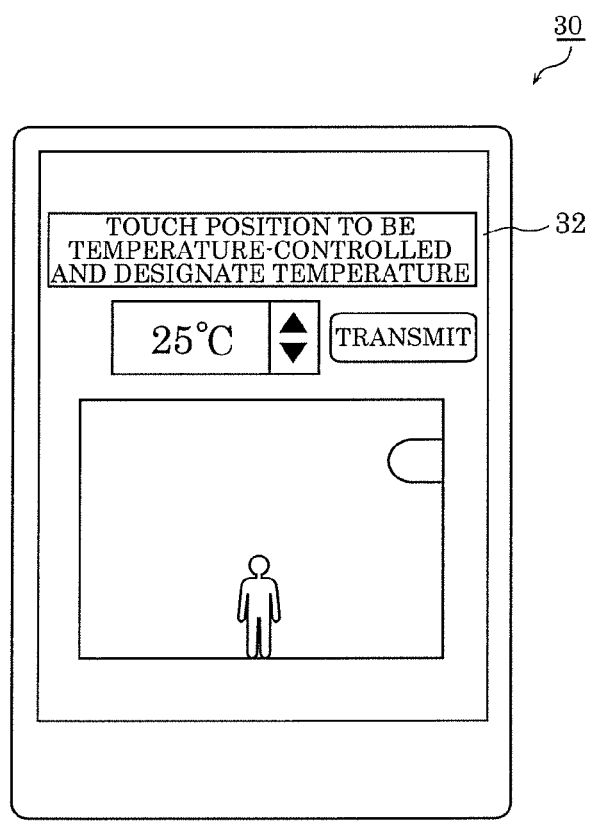
FIG. 6 is a diagram illustrating an example of an image subjected to user operation.

First, display processing unit 34a causes display unit 32 to display an image subjected to operation of user 60 (S21). FIG. 6 is a diagram illustrating an example of an image subjected to operation of user 60. For example, user 60 taps a given point in a schematic diagram illustrating space 50, which is included in the image illustrated in FIG. 6. User 60 also designates a target temperature at the tapped point, through the image.

Operation reception unit 31 receives this operation of user 60. That is, operation reception unit 31 receives the designation of the target temperature at the given position in space 50 (S22). Once operation reception unit 31 has received the designation of the target temperature, estimation unit 34c estimates the three-dimensional temperature distribution (temperature unevenness) inside space 50 using the second numerical fluid dynamic model stored in second storage unit 35 (S23).

After this, control unit 34f controls air conditioner 10 based on the three-dimensional temperature distribution estimated in Step S23 (S24). Specifically, control unit 34f controls air conditioner 10 based on the three-dimensional temperature distribution estimated in Step S23, to bring the given position designated in Step S22 closer to the target temperature.

As described above, environment estimation device 30 can, as a result of estimating the three-dimensional temperature distribution, control air conditioner 10 for the temperature at a position where no temperature sensor is located. Thus, environment estimation device 30 can bring the environmental state at a given position in space 50 to the target environmental state.

[Variation 1]

The temperature information and the three-dimensional temperature distribution used in the foregoing embodiment are respectively an example of environmental information and an example of a three-dimensional environmental distribution. In environment control system 100, for example, humidity, wind speed, airborne particle concentration, or radiant heat may be used as the environmental information. The three-dimensional environmental distribution may be a three-dimensional humidity distribution, a three-dimensional wind speed distribution, a three-dimensional particle concentration distribution, or a three-dimensional radiant heat distribution.

For example, in the case where the environmental information is humidity, environment estimation device 30 obtains humidity information from a humidity sensor located inside space 50 (or outside space 50), and estimates a three-dimensional humidity distribution using a numerical fluid dynamic model for calculating the three-dimensional humidity distribution.

In the case where the environmental information is wind speed, environment estimation device 30 obtains wind speed information from an anemometer located inside space 50 (or outside space 50), and estimates a three-dimensional wind speed distribution using a numerical fluid dynamic model for calculating the three-dimensional wind speed distribution. In the case where the environmental information is airborne particle concentration, environment estimation device 30 obtains airborne particle concentration information from an airborne particle concentration meter located inside space 50 (or outside space 50), and estimates a three-dimensional particle concentration distribution using a numerical fluid dynamic model for calculating the three-dimensional particle concentration distribution. In the case where the environmental information is radiant heat, environment estimation device 30 obtains radiant heat information from a radiometer (heat flux sensor) located inside space 50 (or outside space 50), and estimates a three-dimensional radiant heat distribution using a numerical fluid dynamic model for calculating the three-dimensional radiant heat distribution.

The heat transfer rate used in the foregoing embodiment is an example of a boundary variable. The boundary variable may be any boundary variable corresponding to environmental information. For example, the boundary variable may correspond to humidity, wind speed, airborne particle concentration, or radiant heat.

[Variation 2]

In the foregoing embodiment, the initial value of the heat transfer rate is set beforehand. Alternatively, generation unit 34b in environment estimation device 30 may estimate the initial value of the heat transfer rate, and generate the numerical fluid dynamic model including the estimated initial value of the heat transfer rate as a parameter. By estimating the appropriate initial value and using it, environment estimation device 30 can reduce the calculation costs (calculation amount and calculation time) for determining the object transfer rate.

For example, generation unit 34b may use an average value or median value of object heat transfer rates previously determined by determination unit 34d, as the initial value of the heat transfer rate. That is, generation unit 34b may estimate the initial value of the heat transfer rate using a statistical method based on a history of object heat transfer rates previously determined by determination unit 34d.

Generation unit 34b may estimate the initial value of the heat transfer rate, by machine learning based on the relationship between each object heat transfer rate previously determined by determination unit 34d and various information (space-related information) such as the size of a space having the boundary of the object heat transfer rate and temperature information obtained in the space.

Generation unit 34b may estimate the initial value of the heat transfer rate for space 50, as an object heat transfer rate previously determined by determination unit 34d for another space (e.g. a space environmentally similar to space 50) different from space 50.

In the case where generation unit 34b estimates the initial value of the heat transfer rate for space 50 using an object heat transfer rate previously determined by determination unit 34d as described above, environment estimation device 30 may be implemented, for example, as a server-client system. That is, environment estimation device 30 may include a server device that stores each previously determined object heat transfer rate and information relating to a space having the object heat transfer rate.

Generation unit 34b may estimate the initial value of the heat transfer rate for space 50, based on the temperature information measured by second temperature measurement unit 12 (thermal image sensor), i.e. the surface temperature of the boundary (wall). Generation unit 34b may estimate heat insulation performance based on the temperature change inside space 50 at the time when air conditioner 10 inside space 50 is stopped while the state between inside space 50 and outside space 50 is a thermal equilibrium state or close to a thermal equilibrium state.

[Variation 3]

In the foregoing embodiment, control unit 34f controls one air conditioner 10. Alternatively, control unit 34f may control a plurality of air conditioners 10. Control unit 34f controls at least one appliance that is provided in space 50 and harmonizes (adjusts) the environment inside space 50. Examples of the at least one appliance that harmonizes (adjusts) the environment inside space 50 include a halogen heater, a humidifier, and an air purifier. Control unit 34f may control a plurality of types of appliances such as those listed above.

Likewise, second communication unit 33 obtains the operation state of the at least one appliance that is provided in space 50 and harmonizes the environment inside space 50. The operation state of the appliance may be obtained from the appliance or from a control device that controls the appliance, such as a home energy management system (HEMS) controller. Control unit 34f may obtain the operation states of a plurality of types of appliances.

[Advantageous Effects, Etc.]

As described above, environment estimation device 30 includes: second communication unit 33 that obtains an operation state of at least one appliance provided in space 50 and environmental information inside space 50; generation unit 34b that generates a numerical fluid dynamic model including, as a variation parameter, a boundary variable corresponding to the environmental information inside space 50 at a boundary between inside space 50 and outside space 50, based on the obtained operation state and the obtained environmental information inside space 50; estimation unit 34c that estimates a three-dimensional environmental distribution inside space 50, based on the generated numerical fluid dynamic model; determination unit 34d that changes, by varying the boundary variable from an initial value, first environmental information in a specific region of the estimated three-dimensional environmental distribution, and determine, as an object boundary variable, the boundary variable at a time when a difference between the first environmental information and second environmental information in the specific region included in obtained environmental information inside space 50 is within a predetermined range; and correction unit 34e that corrects the numerical fluid dynamic model, by fixing the variation parameter of the numerical fluid dynamic model at the determined object boundary variable. Second communication unit 33 is an example of an obtainment unit.

Thus, environment estimation device 30 can generate the numerical fluid dynamic model corresponding to space 50, without obtaining the accurate boundary variable at the boundary of space 50 beforehand. By estimating the three-dimensional environmental distribution using such a numerical fluid dynamic model, environment estimation device 30 can estimate the environmental state at a given position in space 50.

Second communication unit 33 may further obtain environmental information outside space 50. Generation unit 34b may generate the numerical fluid dynamic model, based on the obtained operation state, the obtained environmental information inside space 50, and the obtained environmental information outside space 50.

Thus, environment estimation device 30 can estimate the three-dimensional environmental distribution that reflects the environmental state outside space 50.

Second communication unit 33 may further obtain a C value indicating airtightness of space 50. Generation unit 34b may generate the numerical fluid dynamic model, based on the obtained operation state, the obtained environmental information inside space 50, and the obtained C value.

Thus, environment estimation device 30 can estimate the three-dimensional environmental distribution that reflects the C value of space 50.

The environmental information inside space 50 may be temperature information inside space 50. The boundary variable may be a heat transfer rate. Estimation unit 34c may estimate a three-dimensional temperature distribution inside space 50, based on the numerical fluid dynamic model. Determination unit 34d may change first temperature information in a specific region of the estimated three-dimensional temperature distribution, and determine an object heat transfer rate which is the heat transfer rate at a time when a difference between the first temperature information and second temperature information in the specific region included in the obtained temperature information inside space 50 is within a predetermined range.

Thus, environment estimation device 30 can estimate the environmental state at a given position in space 50, by estimating the three-dimensional temperature distribution using the numerical fluid dynamic model.

Generation unit 34b may estimate the initial value of the boundary variable, using a statistical method based on a history of an object boundary variable previously determined by determination unit 34d. Generation unit 34b may generate the numerical fluid dynamic model including, as an initial value of the variation parameter, the estimated initial value of the boundary variable.

The use of such a statistically based initial value can reduce the calculation costs for determining the object boundary variable.

Generation unit 34b may estimate the initial value of the boundary variable, as an object boundary variable determined by determination unit 34d for another space different from space 50. Generation unit 34b may generate the numerical fluid dynamic model including, as an initial value of the variation parameter, the estimated initial value of the boundary variable.

The use of the object boundary variable of another space 50 as the initial value can reduce the calculation costs for determining the object boundary variable of space 50, for example in the case where space 50 and another space 50 are similar.

Generation unit 34b may estimate the initial value of the boundary variable by machine learning. Generation unit 34b may generate the numerical fluid dynamic model including, as an initial value of the variation parameter, the estimated initial value of the boundary variable.

The use of the initial value based on machine learning can reduce the calculation costs for determining the object boundary variable.

The present invention may be implemented as an environment estimation method. The environment estimation method includes: obtaining an operation state of at least one appliance provided in space 50 and environmental information inside space 50; generating, based on the obtained operation state and the obtained environmental information inside space 50, a numerical fluid dynamic model including, as a variation parameter, a boundary variable corresponding to the environmental information at a boundary between inside space 50 and outside space 50; estimating a three-dimensional environmental distribution inside space 50, based on the generated numerical fluid dynamic model; changing, by varying the boundary variable from an initial value, first environmental information in a specific region of the estimated three-dimensional environmental distribution, and determining, as an object boundary variable, the boundary variable at a time when a difference between the first environmental information and second environmental information in the specific region included in the obtained environmental information inside space 50 is within a predetermined range; and correcting the numerical fluid dynamic model, by fixing the variation parameter of the numerical fluid dynamic model at the determined object boundary variable.

Thus, the environment estimation method can generate the numerical fluid dynamic model corresponding to space 50, without obtaining the accurate boundary variable at the boundary of space 50 beforehand. By estimating the three-dimensional environmental distribution using such a numerical fluid dynamic model, the environment estimation method can estimate the environmental state at a given position in space 50.

Other Embodiments

While the environment control system and the environment estimation device according to the embodiment have been described above, the present invention is not limited to the foregoing embodiment.

For example, the communication method between devices in the foregoing embodiment is not limited. In the case where wireless communication is performed between devices, the wireless communication method (communication standard) is, for example, specific low-power radio using frequencies in 920 MHz band, such as Zigbee®, Bluetooth®, or wireless local area network (LAN). The communication between devices may be wired communication instead of wireless communication. Specifically, wired communication is power line communication (PLC), communication using wired LAN, or the like.

In the foregoing embodiment, for example, a process performed by a specific processing unit may be performed by another processing unit. The order of a plurality of processes may be changed, and a plurality of processes may be performed in parallel.

The division of the structural elements of the environment estimation device into the plurality of devices is an example. For example, the environment estimation device may be implemented as a client-server system, where the structural elements included in the environment estimation device in the foregoing embodiment are divided between the server device and the client device. Specifically, of the structural elements included in the environment estimation device, the structural elements used to estimate the three-dimensional environmental distribution may be included in the server device, and the other structural elements in the client device.

Each of the structural elements such as information processing units in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory.

The structural elements such as information processing units may be circuits (or integrated circuits). These circuits may constitute one circuit as a whole, or may be separate circuits. These circuits may each be a general-purpose circuit or a dedicated circuit.

These general and specific aspects of the present invention may be implemented using a system, a device, a method, an integrated circuit, a computer program, or a computer-readable recording medium such as CD-ROM, or any combination of systems, devices, methods, integrated circuits, computer programs, and recording media. For example, in the case where a general-purpose information terminal such as a smartphone or a tablet terminal is used as an environment estimation device, the present invention may be implemented as an application program for causing an information terminal (computer) to function as an environment estimation device. The present invention may be implemented as an environment estimation method performed by an environment estimation device (computer). The present invention may be implemented as an environment control system.

Other modifications obtained by applying various changes conceivable by a person skilled in the art to each embodiment of the structural elements and functions in each embodiment without departing from the scope of the present invention are also included in the present invention.

REFERENCE MARKS IN THE DRAWINGS 30 environment estimation device
31 operation reception unit
32 display unit
33 second communication unit (obtainment unit)
34*b* generation unit
34*c* estimation unit
34*d* determination unit
34*e* correction unit
34*f* control unit
35 second storage unit
50 space

The invention claimed is:

1. An environment estimation device, comprising:
an obtainment unit configured to obtain an operation state of at least one appliance provided in a space from the at least one appliance or a control device of the at least one appliance, and obtain environmental information inside the space;
a generation unit configured to generate, based on the operation state obtained and the environmental information inside the space obtained, a numerical fluid dynamic model including, as a variation parameter, a boundary variable corresponding to the environmental information inside the space at a boundary between inside the space and outside the space;
an estimation unit configured to estimate a three-dimensional environmental distribution inside the space, based on the numerical fluid dynamic model generated;
a determination unit configured to change, by varying the boundary variable from an initial value, first environmental information in a specific region of the three-dimensional environmental distribution estimated, and determine, as an object boundary variable, the boundary variable at a time when a difference between the first environmental information and second environmental information in the specific region included in the environmental information inside the space obtained is within a predetermined range; and
a correction unit configured to correct the numerical fluid dynamic model, by fixing the variation parameter of the numerical fluid dynamic model at the object boundary variable determined.

2. The environment estimation device according to claim 1,
wherein the obtainment unit is configured to further obtain environmental information outside the space, and
the generation unit is configured to generate the numerical fluid dynamic model, based on the operation state obtained, the environmental information inside the space obtained, and the environmental information outside the space obtained.

3. The environment estimation device according to claim 1,
wherein the obtainment unit is configured to further obtain a C value indicating airtightness of the space, and
the generation unit is configured to generate the numerical fluid dynamic model, based on the operation state obtained, the environmental information inside the space obtained, and the C value obtained.

4. The environment estimation device according to claim 1,
wherein the environmental information inside the space is temperature information inside the space,
the boundary variable is a heat transfer rate,
the estimation unit is configured to estimate a three-dimensional temperature distribution inside the space, based on the numerical fluid dynamic model, and
the determination unit is configured to change first temperature information in a specific region of the three-dimensional temperature distribution estimated, and determine an object heat transfer rate which is the heat transfer rate at a time when a difference between the first temperature information and second temperature information in the specific region included in the temperature information inside the space obtained is within a predetermined range.

5. The environment estimation device according to claim 1,
wherein the generation unit is configured to:
estimate the initial value of the boundary variable, using a statistical method based on a history of an object boundary variable previously determined by the determination unit; and
generate the numerical fluid dynamic model including, as an initial value of the variation parameter, the initial value of the boundary variable estimated.

6. The environment estimation device according to claim 1,
wherein the generation unit is configured to:
estimate the initial value of the boundary variable, as an object boundary variable determined by the determination unit for another space different from the space; and
generate the numerical fluid dynamic model including, as an initial value of the variation parameter, the initial value of the boundary variable estimated.

7. The environment estimation device according to claim 1,
wherein the generation unit is configured to:
estimate the initial value of the boundary variable by machine learning; and
generate the numerical fluid dynamic model including, as an initial value of the variation parameter, the initial value of the boundary variable estimated.

8. An environment estimation method, comprising:
obtaining an operation state of at least one appliance provided in a space from the at least one appliance or a control device of the at least one appliance, and obtaining environmental information inside the space;
generating, based on the operation state obtained and the environmental information inside the space obtained, a numerical fluid dynamic model including, as a variation parameter, a boundary variable corresponding to the environmental information inside the space at a boundary between inside the space and outside the space;
estimating a three-dimensional environmental distribution inside the space, based on the numerical fluid dynamic model generated;
changing, by varying the boundary variable from an initial value, first environmental information in a specific region of the three-dimensional environmental distribution estimated, and determining, as an object boundary variable, the boundary variable at a time when a difference between the first environmental information and second environmental information in the specific region included in the environmental information inside the space obtained is within a predetermined range; and
correcting the numerical fluid dynamic model, by fixing the variation parameter of the numerical fluid dynamic model at the object boundary variable.

* * * * *